United States Patent Office 3,647,895
Patented Mar. 7, 1972

3,647,895
PROCESS FOR THE PURIFICATION OF CHLORINATED HYDROCARBONS
Otto Fruhwirth and Ludwig Schmidhammer, Burghausen, Upper Bavaria, Germany, assignors to Wacker-Chemie G.m.b.H., Munich, Germany
No Drawing. Filed Apr. 15, 1969, Ser. No. 816,385
Claims priority, application Germany, Apr. 23, 1968, P 17 68 269.8
Int. Cl. C07c 25/02, 19/00, 21/00
U.S. Cl. 260—650 R                        5 Claims

ABSTRACT OF THE DISCLOSURE

A process for the purification of chlorinated hydrocarbons containing metallic salts of a Lewis-acid type character, as employed as catalysts in a chlorination reaction, which comprises mixing a chlorinated hydrocarbon containing metallic salts of a Lewis-acid type character with from 1 to 5 mols, based on the amount of metallic salt contaminant, of an anhydrous 1,2-monoalkanolamine having from 2 to 4 carbon atoms and from 0 to 4 mols, based on the amount of metallic salt contaminant, of dry ammonia, and separating the insoluble metallic salts from said chlorinated hydrocarbons.

THE PRIOR ART

During the process of the catalytic manufacture of chlorinated hydrocarbons, metallic salts of a Lewis-acid type character are employed as catalysts. When so utilized the reaction products obtained are contaminated with these catalysts. The previously reported purifications to remove metallic salts, of whatever characteristic, from chlorinated hydrocarbons are expensive, give rise to high losses of the desired chlorinated hydrocarbons and are generally technically unsatisfactory.

Examples of the process for the catalytic manufacture of chlorinated hydrocarbons are the chlorination of benzene and the manufacturing of 1,2-dichloroethane from ethylene and chlorine in the liquid phase. In both cases, ferric III chloride can be utilized as a catalyst. For this reason, the raw reaction products contain iron chloride, for example, in a partially combined complex form (ferric III-chloride-1,2-dichloroethane-addition compound). In contrast to the dissolved iron chloride, the complex combined iron chloride cannot be removed by water. On the other hand, an effective treatment with alkali is not advisable because of the sensitivity to alkalis of the chlorinated hydrocarbons.

Large losses of yield also occur on purification of the chlorinated hydrocarbons by distillation since the metallic salt remaining in the sump causes or accelerates a decomposition of the chlorinated hydrocarbon.

Austrian Pat. 238,699 teaches the removal of the metallic salts by cation exchange. However, this is only possible in the presence of aqueous acids, because, otherwise, the complex combined metal cations are not exchanged.

Furthermore, it is known according to German Pat. No. 695,316 to treat chlorinated hydrocarbons with compounds, such as ethylene oxide in the presence of water, in order to free them from metallic salts.

Finally, the Japanese published application No. 13,606/66 discloses a process, according to which a chlorinated hydrocarbon is washed in a first step with dilute hydrochloric acid, and in a second step, without previous drying, the remainder of the metallic salt is removed with gaseous or dilute aqueous ammonia.

The disadvantages of the above-mentioned methods are that they only can be effected in the presence of water and, thereafter, dehydration of the chlorinated hydrocarbon, according to known processes, is required. Furthermore, considerable losses of chlorinated hydrocarbons occur, because of the relatively good water solubility of the chlorinated hydrocarbons. This creates on its part a considerable waste water problem.

OBJECTS OF THE INVENTION

An object of the present invention is the development of an improved anhydrous process for the purification of chlorinated hydrocarbons containing metallic salts.

Another object of the present invention is the development of a process for the purification of chlorinated hydrocarbons containing metallic salts of a Lewis-acid type character, as employed as catalysts in a chlorination reaction, which comprises mixing a chlorinated hydrocarbon containing metallic salts of a Lewis-acid type character with from 1 to 5 mols, based on the amount of metallic salt contaminant, of an anhydrous 1,2-monoalkanolamine having from 2 to 4 carbon atoms and from 0 to 4 mols, based on the amount of metallic salt contaminant, of dry ammonia, and separating the insoluble metallic salts from said chlorinated hydrocarbons.

These and other objects of the invention will become more apparent as the description thereof proceeds.

DESCRIPTION OF THE INVENTION

A novel process for the purification of chlorinated hydrocarbons containing metallic salt contaminants has now been discovered. This process involves the purification of chlorinated hydrocarbons of saturated or unsaturated, aliphatic or aromatic nature from metallic salt contaminants, particularly those of Lewis-acid type characteristics as utilized as catalysts in the chlorination. This process involves mixing the chlorinated hydrocarbon containing metallic salts with from 1 to 5 mols, based on the molar amount of metallic salt contaminant, of an anhydrous 1,2-monoalkanolamine having from 2 to 4 carbon atoms and, optionally, from 1 to mols, based on the molar amount of metallic salt contaminant, of dry ammonia, and separating the insolubilized compounds produced from the chlorinated hydrocarbon.

The process according to the invention obtains, without the addition of water, a quantitative removal of the metallic salt contaminants from the chlorinated hydrocarbon. Even the complex combined part of the contaminants is removed because of the destruction of the addition compounds of the metallic salt and chlorinated hydrocarbon present. The process of the invention forms metallic salts such as poorly soluble amine complex salts which precipitate. A considerable amount of the more expensive 1,2-monoalkanolamine may be replaced by dry ammonia in the process of the invention. Ammonia by itself, however, does not cause a complete precipitation of the metallic salts, since the complex-bonded part of the metallic salts is not reacted.

Furthermore, the pure ammoniumates are hard to filter, whereas amine-addition compounds as well as ammonia-amine-addition compounds with the metallic salts have a good filtering capacity. The filtering capacity (m.³/m.² filter-surface times hours) is increased five times by the process of the invention in contrast with the employment of ammonia as the sole precipitant.

The process may be employed to purify saturated or unsaturated, aliphatic or aromatic chlorinated hydrocarbons contaminated with metallic salts. Particularly, the process is employed to purify saturated or unsaturated chlorinated hydrocarbons containing 1 to 4 carbons atoms, as well as chlorobenzenes. Examples of these are chloroform, carbon tetrachloride, 1,2-dichloroethane, 1,1,2-trichloroethane, trichloroethylene, perchloroethylene, 1,2-dichloropropane, hexachlorbutadiene, monochlorobenzene and o-, m-, or p-dichlorobenzene.

By the process of the invention, metallic salts with a Lewis-acid type character can be removed. For the complex formation with 1,2-monoalkanolamines and, if necessary, ammonia, the cation of the salt is decisive. The anion of the salt plays only a secondary role. Primary cations which are found contaminating chlorinated hydrocarbons are, for instance, aluminum, iron, titanium, bismuth, zinc, antimony, zirconium and vanadium. The most frequent is the ferric or trivalent iron ion.

In general, amounts of from 1 to 5 mols of anhydrous 1,2-monoalkanolamine and, optionally from 1 to 4 mols of dry ammonia per mol of metallic salts contained in the chlorinated hydrocarbons, prove to be sufficient. A greater surplus beyond the amounts mentioned is not necessary. Preferably, 1.5 mols of anhydrous 1,2-monoalkanolamine and 1.5 mols of dry ammonia are utilized. If the 1,2-monoalkanolamines are employed alone, it is preferred to utilize 4 mols for each mol of the metallic salt contaminant. For the removal of iron salts, amounts of from 1.2 to 4 mols of anhydrous 1,2-monalkanolamine, and, optionally, from 1.2 to 3.5 mols of dry ammonia per mol of iron salt contaminant in the chlorinated hydrocarbon are preferably utilized.

Preferably, as the 1,2-monoalkanolamines, are those which have from 2 to 4 carbon atoms. Di- and trialkanolamine are poorly soluble in chlorinated hydrocarbons and, therefore, are not useful. Preferably, ethanolamine is employed. However, 1,2-monopropanolamine and 1,2-monobutanolamine are also equally effective. The 1,2-monoalkanolamines mentioned, for instance, are obtained by the reaction of epoxides of the corresponding chain length with ammonia.

The process of the invention can be effected in a continuous manner or in a non-continuous manner. In a continuous manner, 1,2-monoalkanolamine and, optionally, ammonia are proportionately pumped into a continuous current reactor pipe. In a non-continuous process, the complexing compounds in the amount required based on the metallic salt content of the chlorinated hydrocarbon are mixed with the contaminated chlorinated hydrocarbon by strong agitation, one after the other. Gaseous ammonia can be taken from a bomb and can be administered under atmospheric pressure. However, the process can also be effected with excess pressures up to 20 atm. Preferably, excess pressures from 0 to 5 atm. are used.

The process can be effected within a large range of temperatures. The boiling point and the pour point of the respective chlorinated hydrocarbon determines the limits. Usually temperatures of between 10° C. and 50° C. are employed.

The following specific embodiments are illustrative of the practice of the invention without, however, being deemed limitative in any manner.

EXAMPLE 1

Through the chlorination of ethylene, in the liquid phase, 1,2-dichloroethane was obtained as a raw product containing 750 gm. $FeCl_3/m.^3$. The hydrogen chloride produced by side reaction of the chlorination was removed by vacuous degassing. The iron-containing raw product was pumped with a velocity of 10 $m.^3/h$. through a continuous current reactor pipe having proportionating valves for admitting ammonia and ethanolamine. 11.25 kg. of ethanolamine per hour were added by means of a proportionating pump by opening the ethanolamine valve. The contact period in the reactor pipe was about 30 seconds. By the use of the continuous current reactor pipe, a local overdosage was avoided. The raw product, precipitated within the continuous current reactor pipe, was fed into a 20 $m.^3$ surge tank. From the surge tank, it was transferred by means of a pump to a centrifuge settling filter, precoated with kieselguhr. The filter surface amounted to 20 $m.^2$ and the precoat amounted to about 1 $kg./m.^2$ of filter surface. The filter throughput was about 30,000 liters per hour. The filter capacity was about 1,500 $l./m.^2$ of filter surface per hour The thus-purified 1,2-dichloroethane contained no iron chloride.

EXAMPLE 2

The apparatus used was the same as in Example 1. However, the raw product contained 800 gm. of $FeCl_3/m.^3$ of 1,2-dichloroethane. Simultaneously, 1.85 $m.^3$ of $NH_3/h$. and 4.50 kg. of ethanolamine/h. were continuously proportionated into the continuous current reactor pipe through which the 1,2-dichloroethane was flowing at a rate of 10 $m.^3/h$. The iron chloride was precipitated. The filter throughput measured after the filtration amounted to 30,000 $l./h$. The filter capacity was 1,500 $l./m.^2$ of filter surface per hour. The filtered 1,2-dichloroethane was free of iron chloride.

EXAMPLE 3

The same raw product as in Example 1 was mixed with ammonia, in the same apparatus, and at the same throughput of 10 $m.^3/h.$, by opening the ammonia valve over a rotor meter coming out of an ammonia bomb. By means of a Samson Pressure Regulator, a constant flow of 2.31 $m.^3$ $NH_3/h$. was maintained against the prevailing pressure. The product with the precipitate was treated as described in Example 1. The filter throughput amounted to about 6,000 $l./h$. The filter capacity was about 300 $l./m.^2$ of filter surface per hour. The filtered 1,2-dichloroethane still contained 50 mg. of iron chloride per liter.

This example demonstrates that the use of ammonia as the sole precipitant results in a loss of filter capacity and does not completely purify the 1,2-dichloroethane from its metallic salt contaminants.

EXAMPLE 4

By the chlorination of vinyl chloride in the presence of ferric III chloride, 1,1,2-trichloroethane was formed containing 1 gm. of $FeCl_3/l$. of raw product. Two liters of this ferric ion-containing raw product were mixed subsequently, by vigorous stirring, with 0.32 gm. of gaseous $NH_3$ and 1.13 gm. of ethanolamine. The raw product with precipitate was filtered through a laboratory settling filter, having a filter surface of 10 $cm.^2$. The precoat was 1 gm. of kieselguhr. The filter throughput was about 1.5 $l./h$. The filter capacity amounted to about 150 $ml./cm.^2$ of filter surface per hour. The filtered 1,1,2-trichloroethane was completely free of iron chloride.

EXAMPLE 5

The same raw product as in Example 4 was mixed with 0.32 gm. of gaseous ammonia and 1.4 gm. of 1,2-monopropanolamine. The precipitated products were separated by a laboratory settling filter. The filter throughput was 1.45 $l./h$. The 1,1,2-trichloroethane thus purified did not contain any iron chloride.

EXAMPLE 6

The raw chlorobenzene achieved by the chlorination of benzene in the presence of $FeCl_3$ as a catalyst contained 0.95 gm. of $FeCl_3/l$. of raw product. Two liters of this ferric ion-containing raw product were subsequently admixed, with vigorous stirring, with 0.30 gm. of gaseous $NH_3$ and 1.08 gm. of ethanolamine. The raw product with precipitate was filtered through a laboratory settling filter. The filter throughput was 1.8 $l./h$. The filter capacity was about 180 $ml./cm.^2$ of filter surface per hour. The thus-purified chlorobenzene was free from iron chloride.

EXAMPLE 7

By the chlorination of ethylene in the presence of aluminum chloride 1,2-dichloroethane was obtained containing 1 gm. of aluminum chloride per liter of raw product. Two liters of this aluminum-containing product were subsequently mixed, with vigorous stirring, with 0.38 gm. of gaseous ammonia and 1.4 gm. of ethanolamine. The precipitated compounds were separated by means of a laboratory settling filter. The filter throughput was 1.4 l./h. The filter capacity was about 140 ml./cm.$^2$ of filter surface per hour. The thus-purified 1,2-dichloroethane contained no aluminum chloride.

EXAMPLE 8

By the chlorination of ethylene in the presence of antimony-pentachloride, 1,2-dichloroethane was obtained containing 2 gm. of antimony-pentachloride per liter of raw product. Two liters of this antimony-containing product were mixed, with vigorous stirring, with 0.34 gm. of gaseous ammonia and 1.24 gm. of ethanolamine. The precipitated compounds occurring thereby were removed by means of a laboratory settling filter. The filter throughput was 1.6 l./h. The filter capacity was 160 ml./cm.$^2$ of filter surface per hour. The 1,2-dichloroethane thus obtained contained no antimony-pentachloride.

The preceding specific embodiments are illustrative of the practice of the invention. It is to be understood, however, that other expedients known to those skilled in the art may be employed without departing from the spirit of the invention.

We claim:

1. A process for the purification of chlorinated hydrocarbons containing, as employed as catalysts in a chlorination reaction, which consists of mixing a chlorinated hydrocarbon selected from the group consisting of aliphatic saturated chlorinated hydrocarbons containing 1 to 4 carbon atoms, aliphatic unsaturated chlorinated hydrocarbons containing up to 4 carbon atoms and chlorobenzenes, said chlorinated hydrocarbons having metal cations selected from the group consisting of aluminum, iron, titanium, bismuth, zinc, antimony, zirconium and vanadium, with from 1 to 5 mols, based on the amount of metallic salt contaminant, of an anhydrous 1,2-monoalkanolamine having from 2 to 4 carbon atoms and from 0 to 4 mols, based on the amount of metallic salt contaminant, of dry ammonia, and separating the insoluble metallic salts from said chlorinated hydrocarbons.

2. The process of claim 1 wherein 1.5 mols of said anhydrous 1,2-monoalkanolamine and 1.5 mols of said dry ammonia are utilized per mol of said metallic salt contaminant.

3. The process of claim 1 wherein 4 mols of said anhydrous 1,2-monoalkanolamine and 0 mol of said dry ammonia are utilized per mol of said metalic salt contaminant.

4. The process of claim 1 wherein said metallic salt contaminant is an iron salt and from 1.2 to 4 mols of said anhydrous 1,2-monoalkanolamine and from 1.2 to 3.5 mols of gaseous dry ammonia are utilized per mol of said iron salt contaminant.

5. The process of claim 1 wherein said anhydrous 1,2-alkanolamine is ethanolamine.

References Cited

UNITED STATES PATENTS

| 2,152,720 | 4/1939 | Yabroff | 260—652 P |
| 2,653,904 | 9/1953 | Hanna et al. | 260—650 R |
| 3,115,528 | 12/1963 | Benner et al. | 260—652 P |

FOREIGN PATENTS

| 4,113,606 | 7/1966 | Japan | 260—652 P |

HOWARD T. MARS, Primary Examiner

U.S. Cl. X.R.

260—652 P, 654 S

UNITED STATES PATENT OFFICE
CERTIFICATE OF CORRECTION

FO-1050
(5/69)

Patent No. 3,647,895  Dated March 7, 1972

Inventor(s) OTTO FRUHWIRTH and LUDWIG SCHMIDTHAMMER

It is certified that error appears in the above-identified patent and that said Letters Patent are hereby corrected as shown below:

| PATENT | | APPLICATION | |
|---|---|---|---|
| Column | Line | | |
| 5 | 33 | Paper #4 | The Examiner's amendment was not fully entered. The phrase "Lewis acid metallic salts" has been omitted after "containing". |
| 6 | 1 | Paper #4 | The Examiner's amendment was not fully entered. The phrase "containing Lewis acid metallic salts" has been omitted after "hydrocarbons". |

Signed and sealed this 30th day of January 1973.

(SEAL)
Attest

EDWARD M. FLETCHER, JR.
Attesting Officer

ROBERT GOTTSCHALK
Commissioner of Patents